Sept. 6, 1960 R. H. STAMM 2,951,525
PROCESS FOR STRAIGHTENING METAL SPARS FOR HELICOPTER ROTORS
Filed April 25, 1955 2 Sheets-Sheet 1
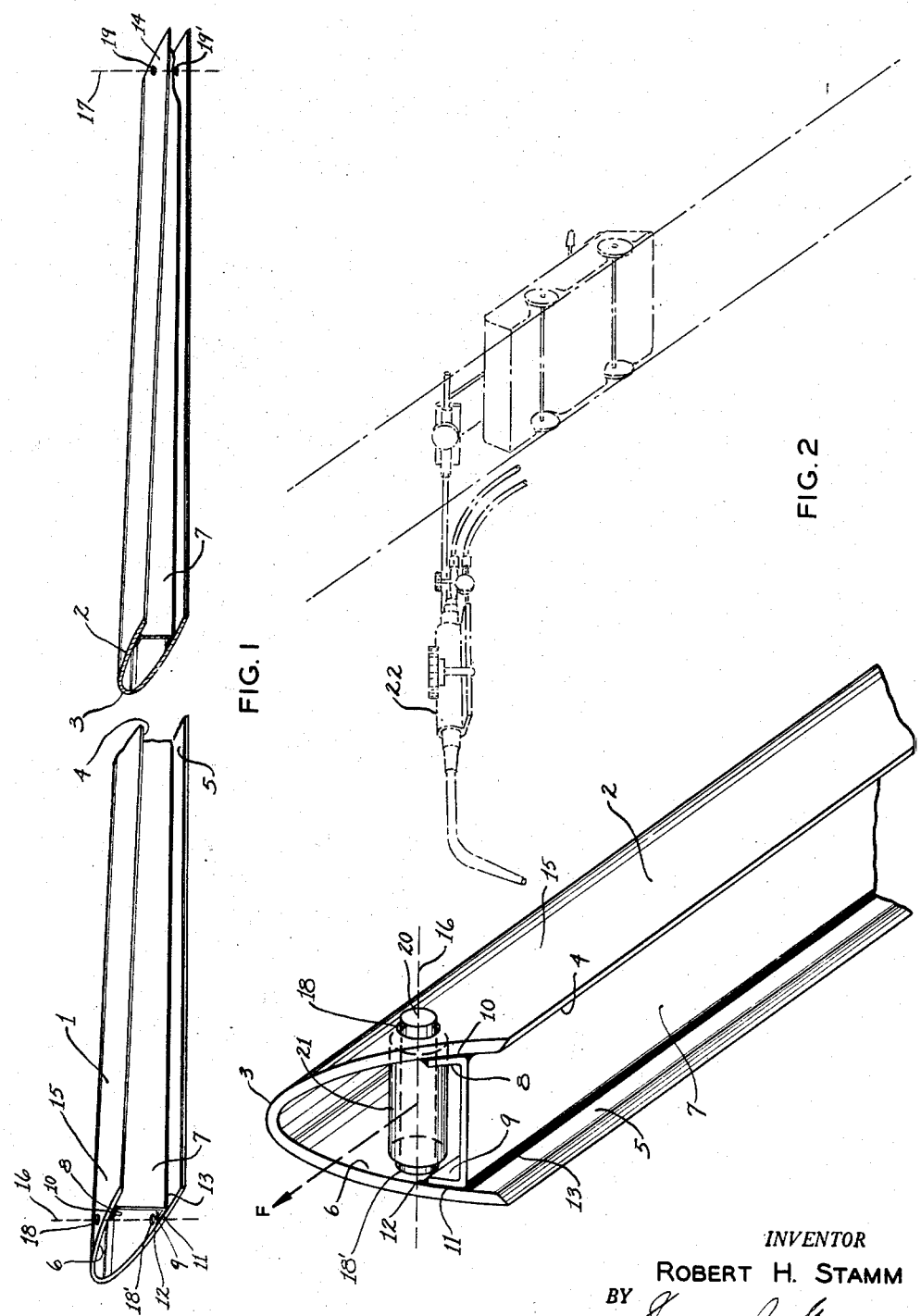
INVENTOR
ROBERT H. STAMM
BY
ATTORNEY

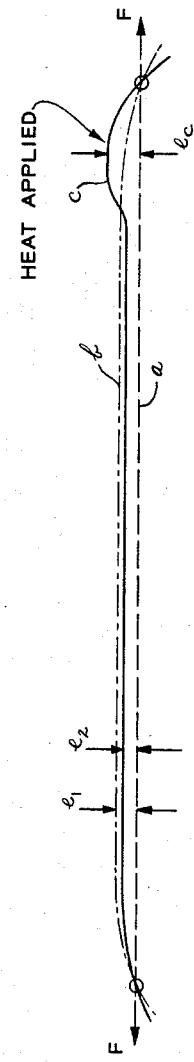
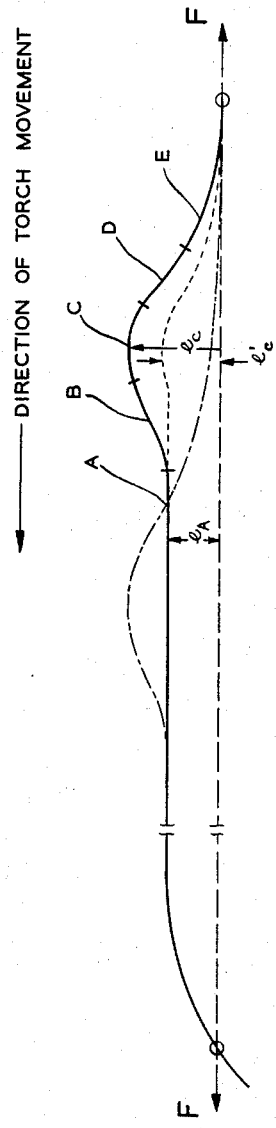

United States Patent Office 2,951,525
Patented Sept. 6, 1960

2,951,525

PROCESS FOR STRAIGHTENING METAL SPARS FOR HELICOPTER ROTORS

Robert H. Stamm, Traverse City, Mich., assignor to Parsons Corporation, Detroit, Mich., a corporation of Michigan Filed Apr. 25, 1955, Ser. No. 503,497

9 Claims. (Cl. 153—35)

The present invention relates to a new process for straightening elongated metal beams, such as the spars of helicopter rotor blades; and also, to the manufacture of straight steel spars of the type joined by brazing, which have a tendency to bow on cooling after the brazing operation.

Two methods of straightening elongated beams have heretofore been used: by applying lateral bending loads in excess of the yield strength of the member in bending; and by stretching the member by tension forces applied to its ends and exceeding the yield strength of the member in tension. The first of these is a delicate process, not suited for mass production. The latter usually leaves the beam with some degree of curvature which defies correction. It is wholly unsuited for straightening spars of tapered cross-section, wherein the sections having smaller area would fail in tension before enough load could be applied to yield the larger sections.

The purposes of the present invention include providing an entirely new spar straightening process which brings about more precise alignment than known processes; is applicable without special manipulation to all similar spars of any production run, regardless of extent of bowing; and is suited for straightening spans of varying cross-section, such as the spars of tapered airfoils.

A further purpose is to provide a method for combining mechanical forces with heat to permanently "set" metal members at low temperature and without undesired warping.

An additional purpose is to manufacture improved brazed steel tubular beams, and particularly spars for tapered airfoils which could not heretofore be manufactured so as to be satisfactorily straight. These objects will be amplified in the explanation and discussion which follow.

In this specification, the term "beam" means a member which is adapted to transmit loads by bending; and it applies to tubular members, including those built up by brazing the flanges of a channel within a curved leading edge plate to form a spar for a helicopter rotor blade. The "chords" of a beam are the portions remote from the neutral bending axis. The term "chordwise bending" is not directly related; it refers to the direction of bending an airfoil so that the leading edge is in compression or tension. For resisting such chordwise bending, the "chords" of such a brazed spar may be considered to be the forward portion of the leading edge, on the one hand, and the aft margins of the curved leading edge plate, on the other; with the neutral axis somewhere between. The term "neutral thread" refers to a spanwise line connecting the neutral axes of successive spanwise sections.

The tapered spar which is a product of the present invention, and the straightening process used to complete its manufacture, will now be described. The tooling and fixtures therefor require little illustration.

Figure 1 is an aft side view, in cabinet projection, of a tapered brazed spar which is a product of the present invention.

Figure 2 is a fragmentary enlarged end view, in projection, of the spar, with a suitable tension-fixture attachment shown in phantom lines.

Figure 3 is a schematic presentation showing in exaggerated form the neutral thread of a bowed spar held aligned in tension, both before and after the initial application of localized heat for straightening.

Figure 4 is a similarly exaggerated presentation of the changes in bending curvature to which the neutral thread may be progressively subjected during the straightening process.

Referring now to Figure 1, there is provided a brazed steel spar assembly generally designated 1, whose principal member is an elongated, leading edge trough-like plate 2, which serves also as the leading edge of the rotor blade itself. The forward portion of the plate 2 is referred to as the leading edge portion 3; it is curved to a relatively small radius to conform to the contour desired for the airfoil section. The plate 2 extends aft to and terminates in upper and lower aft margins respectively numbered 4 and 5, which may be tapered outward and aft as shown. Within the inner surface 6 of the trough plate 2 is fitted a spanwise channel 7, having upper and lower flanges 8, 9, whose outer surfaces are joined to the inner trough plate surface 6 by continuous spanwise upper and lower brazed seams 10, 11. Each of the brazed seams 10, 11, includes a forward brazed fillet 12, and an aft brazed fillet 13, which extend continuously along the span.

While the plate 2 may be of uniform thickness throughout, the spar section described is not constant but enlarges gradually from the tip end 14 to the root end 15. The depth of the channel 7 therefore varies with the change in section.

Figure 2 shows an enlarged view of the root end 15, with the approximate location of the root section neutral axis for chordwise bending 16 designated by a dashed line. A similar dashed line designates the tip section neutral axis 17. Because of the constant taper, the neutral axes for chordwise bending of each of the intermediate sections will lie in a line referred to as the neutral thread, extending from one end of the spar 1 to the other.

The spar 1 is made slightly longer than necessary for use, and root end neutral axis bores 18, 18' are drilled through the upper and lower surfaces respectively of the plate 2 at the root end so that their centers are on the root end neutral axis 15. Similarly, tip section neutral axis bores 19, 19' are drilled through the upper and lower surfaces of the plate 2 along the tip section neutral axis 17.

It will be noted from Figures 1 and 2 that the location of the neutral thread is somewhat forward of the brazed seams 10, 11. On cooling of the areas in the region of these brazed seams 10, 11, following the brazing operation, thermal shrinkage will occur substantially uniformly along the span of the spar 1. This results in bowing, with the leading edge on the outer side of the curve. Such bowing must be corrected to complete the manufacture of the spar.

For spars of constant cross-section or without substantial variation of section properties, otherwise similar to the spar of Figures 1 and 2, preliminary stretch straightening may proceed in the same manner as has heretofore been known. Pins 20 are inserted through the neutral axis bores 18, 18', 19, 19' at each end of the spar, as shown, for its root end in Figure 2. To the pins 20, tension forces are applied by any suitable mechanism or linkage, which may include tubular collars or bushings 21, about the portions of the pins 20 inside the spar ends, likewise shown in Figure 2.

In the course of such preliminary stretch straightening, the magnitude of tension forces to be applied must be sufficiently great to stress substantially all the spar material beyond its yield point in tension. Nevertheless, on release of tension there is usually an objectionable amount of residual bowing. Further, the stretch straightening process is not applicable to spars which taper substantially, for the smaller amount of tip material would fail in tension before the root yielded. Therefore, brazed tapered spars could not be successfully manufactured before the development of the present process.

The same pins 20 fitted with collars 21, or their mechanical equivalents, may be utilized in my new straightening process. First I mount the spar 1 by such pins and fittings in a substantially rigid fixture, and then use any suitable mechanism, such as a turnbuckle, to exert a tension force sufficient to align the spar elastically. Applied to a fairly uniformly aft-bowed spar of constant or taperingly varying cross-section, the moment of such tension force will align the spar 1 elastically straight, except for an immaterial amount of bowing at the root and tip ends immediately adjacent the bores 18, 18', 19, 19'. The greater the bowing, the greater will be the amount of tension required to overcome bowing. However, precise control over applied tension is unnecessary, for the bending moment on each section will be a function of its eccentricity from the line of tension forces, as explained hereafter.

It is to be noted that despite the superposition of tension forces incident to alignment, such alignment actually results from bending moment, in which the fibers of the leading edge 3 are stressed in bending-compression. Therefore, in my next step I apply heat progressively along a narrow band of the fibers so stressed.

I prefer to use a mechanically traversed heating torch generally designated 22, shown with carriage and tracks schematically in Figure 2, and start at one end of the spar. The spot of the torch 22 may be concentrated on an area approximately one-quarter of an inch in width; and to obtain the heat increment necessary for permanent set in bending, a temperature of about 600° F. should be attained in the immediate vicinity of the spot being heated. The hollowness of the spar 1 makes possible fairly uniform heating of such leading edge fibers without adverse increase in temperature of the spar portion aft of the fibers so heated. In all events, I provide progressively along the leading edge 3 of the spar 1 an increment of heating in the fibers of the leading edge sufficient to accomplish the straightening operation described.

The torch 22 is slowly traversed along the leading edge 3 from one end of the spar 1 to the other. As it moves, the narrow band of leading edge fibers is progressively heated by such increment while the spar is restrained by the pins 20 and collars 21 at its ends. Each tiny segment so progressively heated will yield under the forces attending such heat and restraint; and it will then cool to a permanent set. After the torch has completed its travel, the spar 1 is removed from the pins 20 and short segments of its root and tip end portions, which include the bores 18, 18', 19, 19' are cut off. The remainder of the spar 1 will be found to be straight.

The physical changes which accompany progressive straightening are small; and difficulties of observation and unfamiliarity of the phenomena make it necessary to deduce what changes a spar undergoes successively during the straightening process. These may be explained approximately as follows:

When a spar is first subjected to tension forces in the fixture and appears straight along its span (except adjacent the points of load application) there is actually a small eccentricity from the line of applied tension forces to its neutral thread. This eccentricity, designated $e_1$ in Figure 3, will be constant for the entire span of a uniformly bowed constant cross-section spar except at its ends; and such eccentricity multiplied by the tension force produces the necessary amount of bending moment to hold the spar elastically aligned. Such moment puts the spar leading edge in compression-bending.

Referring to Figure 3, the line of dashes $a$ represents the line of action of the tension forces designated by the opposed arrows F. The line of alternating dots and dashes represents the neutral thread of a spar when first aligned in tension in a fixture such as has been described. The eccentricity of the spar when so aligned is the distance $e_1$ from the line of action $a$.

If heat be applied to the extreme fibers of the leading edge, starting at one end, the leading edge will tend to bow outward at that end due to thermal elongation of the heated fibers. Such bowing is illustrated exaggeratedly in Figure 3. Whether it exists in measurable amount, or merely as a tendency imparted by the heating and held substantially in check by the external forces and the elasticity of the material, I find that illustrating it in the manner shown in Figure 3 emphasizes the fact that heat applied locally along the edge which is stressed in bending-compression tends to intensify such stress. Such thermal bowing has a tendency to increase the applied bending moment at the heated section, both by increasing its eccentricity locally and by increasing the tension forces which hold the spar ends from pulling inward. As illustrated in Figure 3, the solid line $c$ represents the neutral thread of a spar held in tension and bowed at its right end by such heating. Such thermal bowing would tend to shorten the distance between the spar ends, but the fixture opposes such movement and in so doing increases the forces F. The aligned portion of the spar to the left of the heated portion assumes a new position of lessened eccentricity $e_2$, so that the aligning moment applied to this portion of the spar by the increased forces F remains unchanged.

Further illustrating the tendency toward thermal bowing utilized in this process, Figure 4 shows minute changes during the heating, yielding and cooling of the leading edge. The neutral thread of the spar is illustrated by the solid line; and the eccentricity of its elastically aligned, unstraightened spar portion A from the dashed line, which is the line of action of the tension forces is designated $e_A$. The leading edge of the spar segment C is heated; the eccentricity of this segment is greatest, and is designated $e_C$.

At segment C, thermal bowing at the point of most intense heating is offset by progressive yielding. The most highly stressed fibers are also the most highly heated, and yield first.

Segment E is the previously yielded and cooled segment. Its curvature ranges from straight near the point of application of tension force, to a backward curvature, opposite the original bowing curvature, at its junction with segment D. This curvature is imposed on the straightened segment by the moment of the external forces.

Segment B is the transition segment between segments A and C; and segment D is the transition segment between segments C and E. In these transition segments, there are gradual changes of heat and applied moment due to varying eccentricity.

To straighten a beam by bending it into alignment, the elasticity of the material would normally require that it be bent beyond the desired alignment, and then permitted to spring back. In the present process, the heating and tendency toward thermal bowing make possible the necessary permanent set without bending beyond the desired alignment. It operates in the following manner:

For steel, the coefficient of thermal expansion is taken to be $6 \times 10^{-6}$ inches per inch per degree Fahrenheit, so that a 400° F. heat increment would tend to cause an elongation of .0024 inch per inch. Taking the modulus of elasticity of steel to be $30 \times 10^6$ pounds per square inch, the compressive stress which would accompany complete restraint of elongation would be 72,000 pounds per square inch. This is approximately the yield stress for normalized steel at room temperature; at the temperature to which the extreme fibers are heated the yield point would be materially lower. Thus, in Figure 4 the eccentricity $e_C$ of the heated portion cannot greatly exceed that of the unheated portion $e_A$; for as the applied moment increases with thermal bowing, the yield point of the material decreases. For this reason, I show the dotted line in Figure 4 and the eccentricity $e'_C$ as an alternate representation which takes account of the local decrease in yield strength with heat. This alternate representation is believed to be a truer one wherever the stress level accompanying elastic alignment nears the yield strength of the material at room temperature.

At the point of heating of segment C, the applied moment offsets the curvature of the beam, that is, it completely restrains thermal elongation, causing yield to occur. On yielding, the applied forces tend to draw the yielded segment toward their line of action, reducing eccentricity of the segment and thereby limiting the amount of yielding. The extent to which a segment is yielded in straightening is thus controlled by its own initial elastic bending strain when held in tension before heat is applied. In this manner, the straightening process is substantially self-controlling.

The constantly-moving mechanically traversed torch 22 passes progressively along the extreme leading edge fibers, successively heating, yielding, and permitting to cool the next adjacent points in the leading edge. As it progresses, the neutral thread in effect undergoes a wave of straightening, which passes spanwise somewhat as illustrated by the dot-and-dash line of Figure 4.

The temperature increment to be gained on heating is one which operates in relation to the temperature of the spar portions chordwise aft of the point of heating; otherwise the heating would not exert a bowing tendency. Since the chordwise aft portions tend to heat somewhat, I raise the temperature of each heated spot by an increment of at least 400° F. over the temperature of such aft spar portions. The tubular shape of the present spar makes it easy to heat the fibers to be yielded without unduly raising the temperature of such aft portions. In practice it is possible to disregard the temperature of the aft portions of this particular structure and merely heat the leading edge fibers to 600° F. or slightly higher. If care be taken to minimize the heat transfer to the aft portions, heating the leading edge to approximately 500° F. will prove satisfactory, where ordinary steel is used. A temperature of 1000° F. is to be considered as a practical maximum, although the limiting temperature is the critical temperature at which material properties would be affected. For steel this temperature is usually considered to be 1350° F.

For other metals and alloys, appropriate temperatures are readily found by test. The fibers heated should be heated evenly, so as to assure a sufficient temperature increment to all adjacent points along the leading edge. The mechanical torch 22 has proved to be entirely satisfactory; but other methods of applying heat locally and progressively could be used, such as electrical induction heating.

The process disclosed herein is adapted for straightening elongated members made of a variety of metals and their alloys which have sufficient ductility to yield and shorten in compression. With each, a sufficient increment of heat must be applied progressively to the edge originally bowed outward to effect yield under bending restraint. The heat increment tends to cause outward bowing or warping unless offset by such restraint; and the strain experienced by the fibers so heated and restrained must equal or exceed the value at which the material will yield in compression. However, this presents no practical problem; for common structural metals appear to possess suitable relationships between modulus of elasticity, coefficient of thermal expansion, yield stress, and ductility to make the process operative.

While I show here the use of pins concentric with the neutral axes for chordwise bending of each of the ends of the spar so as to apply no moments to the ends, other types of fittings, less perfectly adapted in theory to the process, still will be found to function with varying degrees of satisfaction. In some applications, such as with built-up composite spars wherein it is difficult to distribute tension forces evenly, it may be preferred to modify the present process. In one modification, bending moments are carefully applied to the spar ends by eccentric fittings, with or without super-imposed tension forces. With the spar restrained at its ends by such bending moments, the torch is traversed along the leading edge and the above described process otherwise carried out as has been described. The application of substantial bending moments to the spar end results in loss of some significant advantages of the described process, for example, its broad tolerance of variation in curvature of specimens, and its self-controlling response to heat. However, as employed by skillful workers, the modified process is nevertheless a valuable one.

Many other uses of the present process and other modifications in the procedural steps thereof, the fixtures utilized, and the products to which applied, will occur to those familiar with the art of metal fabrication. For example, the spar which is the product of this invention need not be brazed; the same problem would be presented and similar results obtained with spars joined by other processes, such as bonding under substantial heat. Accordingly, the present invention is not to be construed narrowly, but as fully coextensive with the disclosure hereof, limited, however, by the claims which follow.

I claim:

1. A process for straightening a beam which is bowed in a plane perpendicular to a neutral bending axis, comprising the steps of exerting a tension force on each end of the beam at its neutral axis for bending in such plane in sufficient magnitude as to align the beam elastically straight between its ends, and thereby cause bending-compression stresses in the edge of the beam theretofore bowed outward, then heating a spot in said stressed edge adjacent one end of the beam until it yields in bending-compression, then heating the spot in said edge next adjacent until it likewise yields, the spot theretofore heated commencing meantime to cool, and continuing such heating and yielding and cooling progressively along said stressed edge to the other end of the beam, whereby the beam is progressively yielded to straightness.

2. A process for progressively straightening a bowed metal spar without bending it to a bow having opposite curvature, comprising the steps of applying forces to its ends sufficient to align it elastically straight and whereby to resist thermal warping, and then applying localized heat progressively in a spanwise direction, starting at one end of the spar, to successively adjacent small portions in and along the theretofore outward-bowed edge of the spar, the portions theretofore heated commencing meantime to cool, the temperature of each portion heated being raised by such increment that its strain from resisting thermal warping exceeds the strain at which the material will yield in compression, whereby the portions so heated are progressively yielded and permanently shortened sufficiently to align the spar straight.

3. A process for progressively straightening a bowed steel spar, comprising the steps of applying tension forces to its ends substantially at its neutral axis and sufficient to align it elastically straight, restraining its ends spaced in tension, and then applying localized heat progressively in a spanwise direction, starting at one end of the spar, to successively adjacent small portions in and along the theretofore outward-bowed edge of the spar, the temperature of each portion heated being raised to approximately 600° F. and thereafter being permitted to lower as the adjacent portions are successively heated, whereby the portions so heated are progressively yielded and permanently shortened sufficiently to align the spar straight.

4. A process for progressively straightening a bowed steel spar, comprising the steps of applying tension forces to its ends substantially at its neutral axis and sufficient to align it elastically straight, restraining its ends spaced in tension, and then applying localized heat progressively in a spanwise direction, starting at one end of the spar, to successively adjacent small portions in and along the theretofore outward-bowed edge of the spar, the temperature of each portion heated being raised to a point between 500° F. and 1000° F. and thereafter being permitted to lower as the adjacent portions are successively heated, whereby the portions so heated are progressively yielded and permanently shortened sufficiently to align the spar straight.

5. A process for progressively straightening a bowed steel spar, comprising the steps of applying tension forces to its ends substantially at its neutral axis and sufficient to align it elastically straight, restraining its ends spaced in tension, and then applying localized heat progressively in a spanwise direction, starting at one end of the spar, to successively adjacent small portions in and along the theretofore outward-bowed edge of the spar, the temperature of each portion heated being raised by an increment of at least 400° F. over the temperature of the unheated portion of the spar at the same cross-section and thereafter being permitted to lower as the adjacent portions are successively heated, whereby the portions so heated are progressively yielded and permanently shortened sufficiently to align the spar straight.

6. A process for straightening a bowed tubular spar whose cross-sections are constant or constantly-tapering, comprising the steps of exerting opposed tension forces at the ends of the spar in such manner as would impose no bending stresses on the spar if it were initially straight, whereby to hold the spar elastically straight and to impose bending-compressive stresses along the edge thereof initially bowed outward, then applying heat progressively along said edge between its ends in sufficient intensity to raise such bending-compressive stresses beyond the yield point of the metal, the portions theretofore heated commencing meantime to cool, whereby the yielded metal in said edge is progressively and permanently shortened in bending-compression sufficiently to hold each section in straight alignment with the others.

7. A process for straightening steel spars bowed by thermal shrinkage due to brazing chordwise aft of the line of neutral axes for chordwise bending, comprising the steps of exerting opposed tension forces adjacent each spar end, the magnitude of said opposed forces being sufficient to align the spar elastically and thereby impose bending-compression stresses on the extreme fibers of the leading edge commensurate with the degree of initial bowing of the spar, holding the spacing of the points of application of said tension forces, and applying localized heat progressively along the extreme fibers of the leading edge in sufficient intensity to raise the level of stress within said extreme fibers beyond the yield point, whereby the said leading edge fibers are progressively and permanently shortened in bending-compression sufficiently to compensate for such thermal shrinkage due to brazing, and permitting the extreme fibers so shortened to cool as heat is applied progressively to adjacent extreme fibers.

8. A method of permanently setting an elongated metal object to conform to a desired alignment, consisting of the steps of applying external mechanical forces whereby to bend such object elastically into such desired alignment, thereby setting up bending-compression stresses in one edge of the object, fixing the points where said forces are applied, applying heat to a small area in the edge so stressed in bending-compression, whereby to cause a tendency to bow the object which is resisted by the said external mechanical forces acting at said fixed points, the intensity of such applied heat being sufficient, in combination with the bending-compressive stresses set up by such applied forces, to yield the heated area in bending-compression, then applying such heat in the same manner successively to all other areas aligned along the edge of the object so stressed, whereby the said object is progressively yielded to such desired alignment.

9. A method of yielding an elongated elastic ductile member so that it permanently maintains a desired alignment, comprising the steps of constraining the member to the desired alignment under external forces having fixed points of application, thereby imposing bending-compressive stresses along one side of the member, and intensifying such bending-compressive stresses to exceed the yield point of the material by applying heat locally along the said side of the member, whereby thermal warpage of the member is resisted in bending-compression, commencing such heat application near one end of the member, and moving the point of heat application progressively along the side thereof stressed in bending-compression by said external forces, whereby the member is progressively and permanently set in such desired alignment.

References Cited in the file of this patent

UNITED STATES PATENTS

| | | |
|---|---|---|
| 1,570,815 | Wylie | Jan. 26, 1926 |
| 2,286,893 | Boissou | June 16, 1942 |
| 2,299,778 | Wissler | Oct. 27, 1942 |
| 2,412,041 | Gifford | Dec. 3, 1946 |
| 2,609,859 | Fitchmueller | Sept. 9, 1952 |

FOREIGN PATENTS

| | | |
|---|---|---|
| 3,555 | Great Britain | of 1914 |
| 15,991 | Great Britain | of 1890 |